(12) United States Patent
Chandran et al.

(10) Patent No.: US 8,554,396 B2
(45) Date of Patent: Oct. 8, 2013

(54) SYSTEMS AND METHODS FOR ISSUING A HARD LANDING WARNING AND PROVIDING MAINTENANCE ADVISORIES FOR HARD LANDING INCIDENTS

(75) Inventors: Nagarajan Chandran, Karnataka (IN); Girish M Lad, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/342,759

(22) Filed: Jan. 3, 2012

(65) Prior Publication Data
US 2013/0173092 A1 Jul. 4, 2013

(51) Int. Cl.
*G08B 21/00* (2006.01)

(52) U.S. Cl.
USPC .......................................... 701/16; 340/945

(58) Field of Classification Search
USPC ............ 701/3–5, 7–9, 16; 340/945, 947, 948, 340/951, 960, 963, 983; 244/81, 183; 73/178 T
See application file for complete search history.

(56) References Cited

U.S. PATENT DOCUMENTS

| | | | |
|---|---|---|---|
| 6,676,075 B2 | 1/2004 | Cowan et al. | |
| 7,946,165 B2 | 5/2011 | Cahill | |
| 2003/0042354 A1* | 3/2003 | Cowan et al. | 244/1 R |
| 2005/0033489 A1 | 2/2005 | Tezuka | |
| 2005/0151003 A1* | 7/2005 | Churchman | 244/12.3 |
| 2005/0192739 A1* | 9/2005 | Conner et al. | 701/120 |
| 2006/0220917 A1* | 10/2006 | Nance | 340/960 |
| 2007/0008187 A1* | 1/2007 | Schmidt | 340/970 |
| 2010/0114411 A1 | 5/2010 | Schmidt | |
| 2010/0281967 A1* | 11/2010 | Cahill | 73/146 |
| 2011/0046825 A1* | 2/2011 | Lastere et al. | 701/16 |
| 2011/0276217 A1* | 11/2011 | Sim et al. | 701/29 |
| 2013/0030614 A1* | 1/2013 | Ding et al. | 701/16 |

FOREIGN PATENT DOCUMENTS

WO 2010031179 A1 3/2010

* cited by examiner

*Primary Examiner* — Mary Cheung
(74) *Attorney, Agent, or Firm* — Ingrassia Fisher & Lorenz, P.C.

(57) ABSTRACT

An aircraft is provided. The aircraft may include, but is not limited to, an accelerometer configured to measure a deceleration experienced by the aircraft and a processor coupled to the accelerometer. The processor may be configured to determine if the aircraft experienced a hard landing if the deceleration experienced by the aircraft was greater than a predetermined threshold, and generate a maintenance advisory if the aircraft experienced a hard landing.

12 Claims, 3 Drawing Sheets

SYSTEMS AND METHODS FOR ISSUING A HARD LANDING WARNING AND PROVIDING MAINTENANCE ADVISORIES FOR HARD LANDING INCIDENTS

TECHNICAL FIELD

The following relates to aircrafts, and more particularly to systems and methods for issuing a hard landing warning and providing maintenance advisories for hard landing incidents.

BACKGROUND

Aircraft, such as helicopters and airplanes, can be damaged during hard landings. Hard landings occur when the aircraft impacts the ground with a greater vertical speed than a designed normal landing force but with less force than a crash landing. Accordingly, there is a need for systems and methods for warning a pilot of potential hard landings and for providing maintenance advisories for hard landing incidents.

SUMMARY

In accordance with one embodiment, an aircraft is provided. The aircraft may include, but is not limited to, an accelerometer configured to measure a deceleration experienced by the aircraft and a processor coupled to the accelerometer. The processor may be configured to determine if the aircraft experienced a hard landing if the deceleration experienced by the aircraft was greater than a predetermined threshold, and generate a maintenance advisory if the aircraft experienced a hard landing.

In accordance with another embodiment, a hard landing warning system for an aircraft is provided. The hard landing warning system may include, but is not limited to, at least one flight instrument collecting flight instrument data, a hard landing indicator, and a processor coupled to the at least one flight instrument and the hard landing indicator. The processor may be configured to determine if the aircraft is in a landing phase based upon the flight instrument data, determine, when the aircraft is in a landing phase, a descent condition of the aircraft based upon the flight instrument data, and issue a hard landing warning via the hard landing indicator if the descent condition indicates a potential hard landing.

In accordance with yet another embodiment, a method is provided. The method may include, but is not limited to, determining if an aircraft is in a landing phase, determining, when the aircraft is in a landing phase, a descent condition for the aircraft, and issuing a hard landing warning when the descent condition indicates a possibility of a hard landing.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWING FIGURES

Exemplary embodiments will hereinafter be described in conjunction with the following drawing figures, wherein like numerals denote like elements.

DETAILED DESCRIPTION

According to various exemplary embodiments, an aircraft having a hard landing prediction and warning system is provided. The hard landing prediction system may provide a warning to a pilot when the aircraft could experience a hard landing. The hard landing system may also provide a maintenance advisory when an aircraft has experienced a hard landing.

Figure 1:
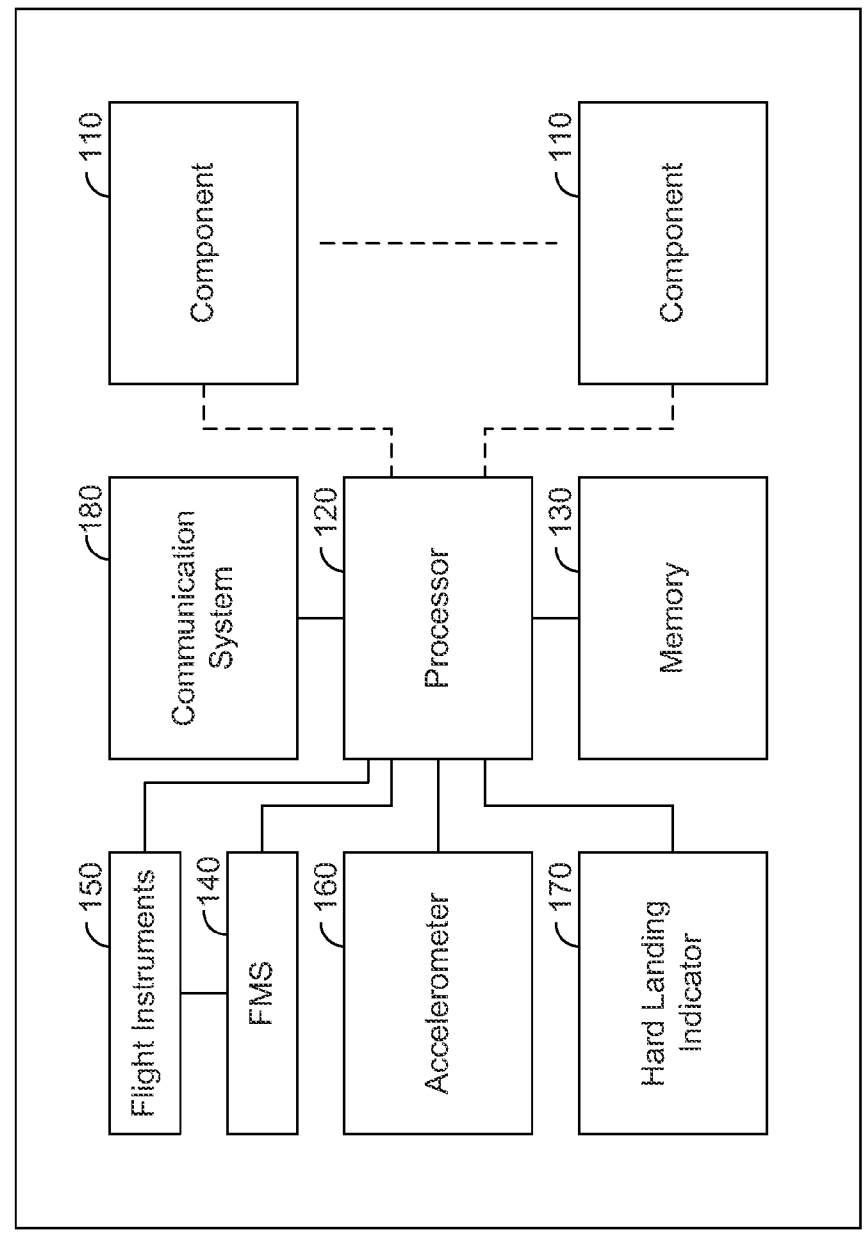
FIG. 1 is a block diagram of an aircraft having a hard landing system, in accordance with an embodiment.

FIG. 1 is a block diagram of an aircraft 100 having a hard landing prediction and warning system in accordance with an embodiment. The aircraft 100 may be any type of aircraft. In one embodiment, for example, the aircraft 100 may be a rotary-winged aircraft such as a helicopter. In another embodiment, for example, the aircraft 100 may be a fixed wing aircraft, such as an airplane. The aircraft 100 includes any number of aircraft components 110. The aircraft components 110 include the structural components, the mechanical components, and the electrical components that makeup the aircraft 100.

The aircraft 100 also includes a processor 120. The processor 120 may be any type of processor. For example, the processor 120 could be a central processing unit, a graphical processing unit, a physics processing unit, an application specific integrated circuit, a microprocessor, a field programmable gate array or any other type of logic device or combination thereof. In one embodiment, for example, the processor 120 could be part of another aircraft system, such as a flight management system 140, discussed in further detail below.

The processor 120 is coupled to a memory 130. The memory 130 may be any type of memory. In one embodiment, for example, the memory may be a non-volatile memory. Each aircraft component 110 has a threshold above which damage could occur during a hard landing. Some aircraft components 110 could be more susceptible to damage than other aircraft components 110. The memory 130 is configured to store a threshold for each aircraft component above which damage could occur to the respective aircraft component 110 during a hard landing.

The aircraft 100 also includes a flight management system (FMS) 140, various flight instruments 150, or a combination thereof. The FMS 140 and/or flight instruments 150 can monitor the location, airspeed, altitude, attitude and descent rate of the aircraft 100. The FMS 140 and/or flight instruments 150 may also store a flight plan for the aircraft 100 on the memory 130. The flight plan may include an indication of a landing phase, as discussed in further detail below. The aircraft may also include an accelerometer 160. The accelerometer 160 can measure a deceleration experienced by the aircraft 100 during a landing. The FMS 140, flight instruments 150 and accelerometer 160 are communicatively coupled to the processor 120.

The processor 120, based upon the flight instrument data and/or other considerations, determines if the aircraft could experience a hard landing, as discussed in further detail below. The aircraft also includes a hard landing indicator 170. The hard landing indicator 170 may include a visual indicator, an audible indicator, or a combination thereof to warn a pilot of a potential hard landing. If the processor 120 determines that the aircraft could experience a hard landing, the processor 120 may issue a hard landing warning to the pilot via the hard landing indicator 170.

Figure 2:
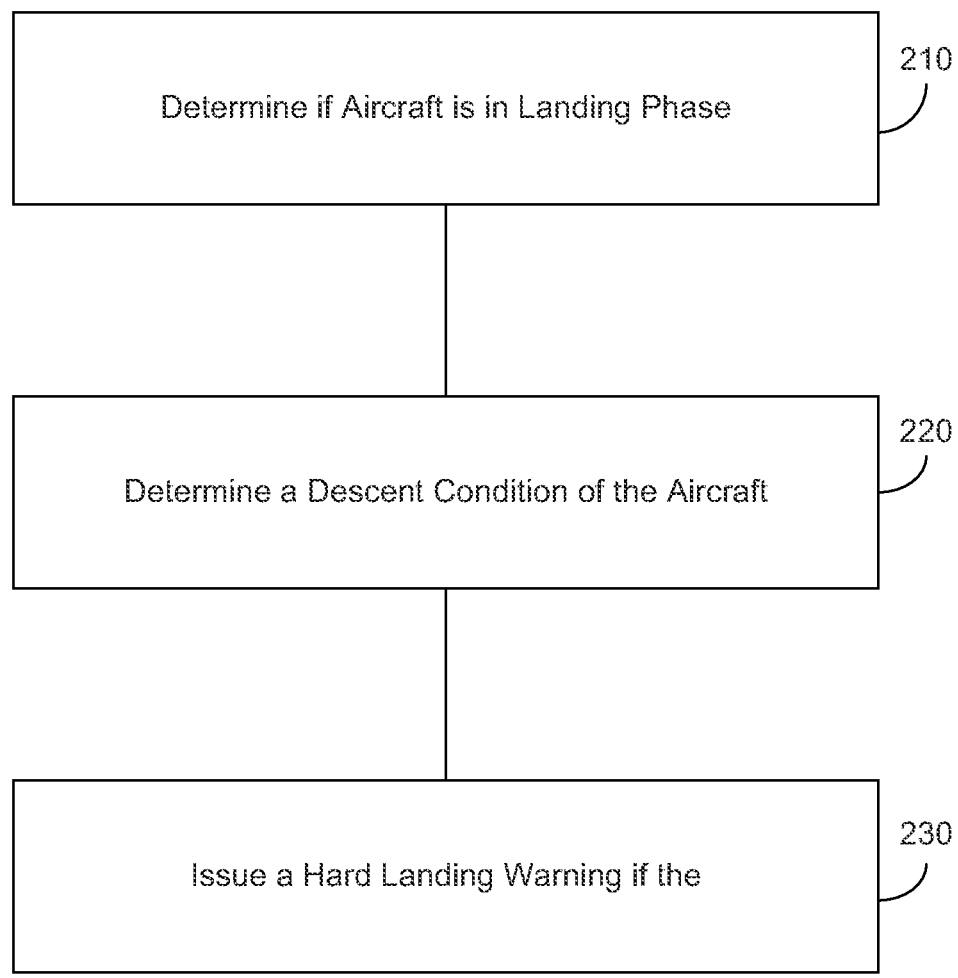
FIG. 2 is a flow chart illustrating an exemplary method for monitoring for a hard landing, in accordance with an embodiment.

FIG. 2 is a flow chart illustrating an exemplary method 200 for monitoring for a hard landing, in accordance with an embodiment. The processor 120 first determines if the aircraft is in a landing phase. (Step 210). As discussed above, the FMS 140 and/or flight instruments 150 can monitor the location, airspeed, altitude, attitude and/or descent rate of the aircraft 100. The processor 120, based upon the location, airspeed, altitude, attitude and/or descent rate of the aircraft 100, can determine if the aircraft 100 is in a landing phase. As discussed above, the flight plan stored in the memory 130 may also include an indication of a landing phase. Accordingly, the processor 120 can also determine if the aircraft is in a landing phase based upon a location of the aircraft along the flight plan.

The processor 120 then determines a descent condition for the aircraft. (Step 220). The processor 120 can determine the descent condition for the aircraft based upon any number of factors. For example, the processor may take into account the vertical speed or descent rate of the aircraft 100. If the vertical speed or descent rate is above a threshold, the processor 120 may determine that the descent condition indicates that the aircraft 100 may experience a hard landing. In one embodiment, for example, the processor may also take into account various parameters and characteristics of the aircraft 100. For example, the processor 120 may take into account the aircraft's configuration, weight, airspeed, altitude, attitude, engine speed, rotor health and/or rotor position when determining the desired descent condition for the aircraft 100.

The processor 120, based the descent condition, may issue a hard landing warning to the pilot. (Step 230). As discussed above, the aircraft 100 could include an audio, visual or audio and visual hard landing indicator 170. The hard landing warning should give the pilot the opportunity to slow the aircrafts descent to prevent the hard landing.

Returning to FIG. 1, the aircraft may also include an accelerometer 160. The accelerometer 160 can measure a deceleration force experienced by the aircraft 100 during a landing. The processor 120, based upon the deceleration force experienced by the aircraft 100 during a landing may issue a maintenance advisory if any of the aircraft components 110 could have been damaged during the landing. The maintenance advisory may be communicated to maintenance personnel via a communications system 180. The communications system 180 could be any type of communications system including, but not limited to, cellular, satellite, Wi-Fi, 3G or 4G connections.

Figure 3:
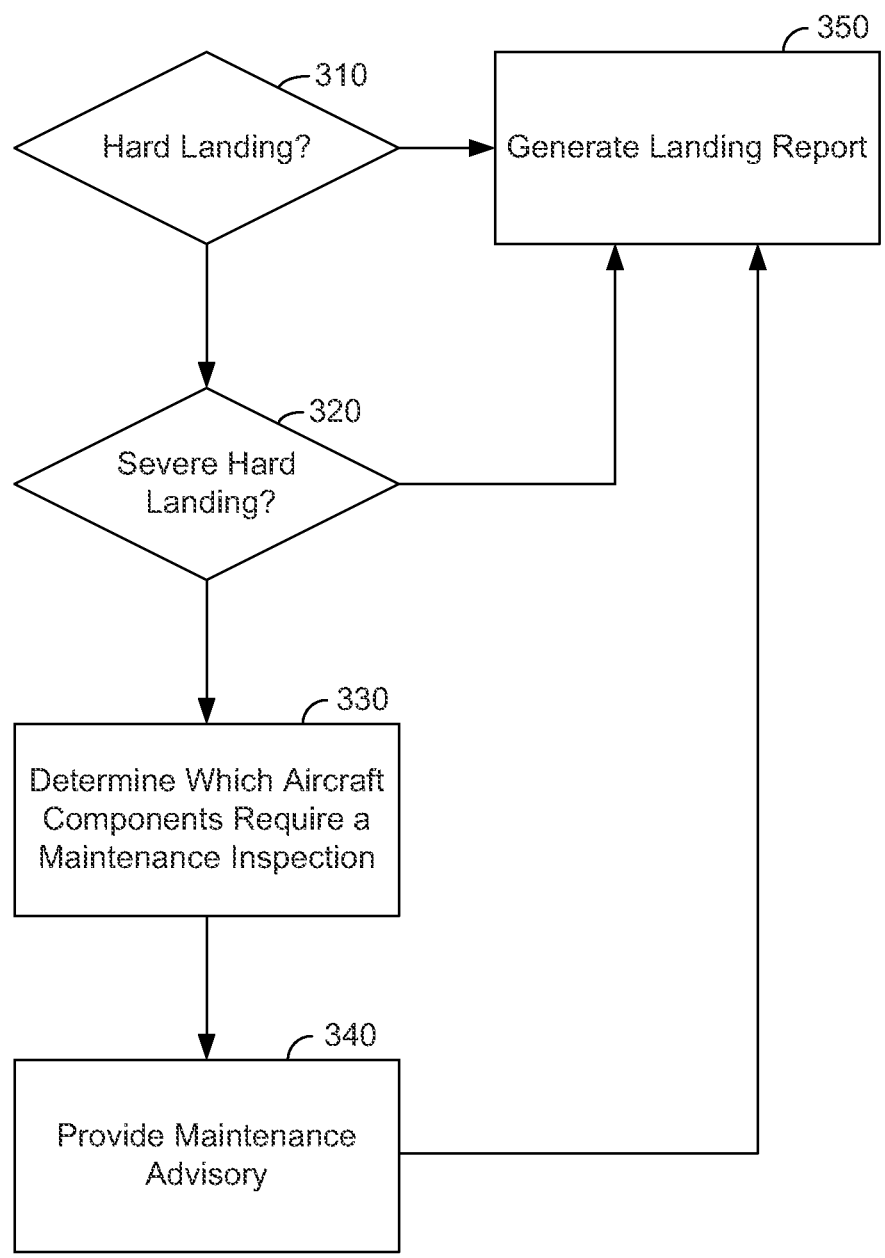
FIG. 3 is a flow chart illustrating a method for providing maintenance advisories in accordance with an embodiment.

FIG. 3 is a flow chart illustrating a method 300 for providing maintenance advisories in accordance with an embodiment. The processor 120 first determines if the aircraft experienced a hard landing. (Step 310). In one embodiment, for example, the processor 120 may receive a measurement from the accelerometer 160 illustrated in FIG. 1. If the deceleration of the aircraft 100 exceeded a predetermined threshold, the processor 120 may determine that the aircraft experienced a hard landing. The predetermined threshold can vary depending upon the type, weight and configuration of the aircraft 100. Typical threshold limit varies from component to component and varies between fixed wing and rotary wing aircraft. In some aircraft, a typical component may have to withstand a 6 g load. Other aircraft components 110 may have to be able to withstand a 20 g load to prove to be airworthy. The configuration of the aircraft changes based on mission needs and other changes done to the aircraft. For example auxiliary fuel tanks added for longer missions change the aircraft's configuration and all the balance computations have to be done again. In the similar manner, an aircraft could be configured with additional navigation radios, navigation aids, electronic flight bags, maintenance computers, maintenance specific instrumentation, or other aircraft components. If the aircrafts deceleration did not exceed a predetermined threshold, the processor 120 generates a landing report and stores the landing report in the memory 130. (Step 350). The landing report may be used, for example, for data analysis or to track pilot landing performance history.

In one embodiment, for example, the processor 120 may also determine if the aircraft 100 experienced a severe hard landing. (Step 320). The processor 120 could receive a measurement from the accelerometer 160 illustrated in FIG. 1. If the deceleration of the aircraft 100 exceeded a predetermined threshold by a marginally higher percentage, for example, five percent, the processor 120 may determine that the aircraft experienced a severe hard landing. The predetermined threshold can vary depending upon the type, weight and configuration of the aircraft 100. In one embodiment, for example, the severe hard landing threshold may indicate the potential for immediate damage to an aircraft component 110. In contrast, in one embodiment, for example, the threshold used in determining a hard landing in step 310 may indicate a hard landing that could have cumulative long-term impact on aircraft components 110. In one embodiment, for example, a server hard landing may be characterized as any landing where the aircraft, or one of the aircraft components, experienced a landing where the tolerance of the aircraft, or an aircraft component, threshold was exceeded by five percent or more. An aircraft landing which exceeded the tolerance of the aircraft, or an aircraft component, by zero to four percent (i.e., the threshold used in determining a hard landing in step 310) may not result in an immediate maintenance advisory and may only be considered for long term impact analysis or fatigue analysis. In one embodiment, for example, if the aircraft was determined to have a hard landing, but not a sever hard landing, the processor 120 then generates a landing report and stores the landing report in the memory 130. (Step 350).

If the aircraft 100 was determined to have experienced a hard landing, the processor 120 determines which, if any, of the aircraft components 110 could require maintenance inspection because of the landing. (Step 330). In one embodiment, for example, a threshold may be stored in the memory 130 for each aircraft component 110. The processor 120 may compare the deceleration experienced by the aircraft against the threshold for each aircraft component 110 to determine which aircraft components may require maintenance inspection because of the hard landing. In one embodiment, for example, the threshold for each aircraft component 110 may be stored in units of standard gravity, sometimes referred to as "g." While FIG. 1 illustrates the processor 120, memory 130, FMS 140, flight instruments 150, accelerometer 160, hard landing indicator 170 and communications system 180 as being separate from the aircraft components 110, the processor 120 may also consider whether the processor 120, memory 130, FMS 140, flight instruments 150, accelerometer 160, hard landing indicator 170 and/or communications system 180 require maintenance inspection because of the landing. In one embodiment, for example, the processor 120, memory 130, FMS 140, flight instruments 150, accelerometer 160, hard landing indicator 170 and/or communications system 180 may be assigned an identical threshold such that the hard landing system is inspected if the threshold is exceeded during a landing.

After the processor 120 determines which aircraft components could have been damaged, the processor 120 generates and issues maintenance advisory. (Step 340). In one embodiment, for example, the maintenance advisory may be transmitted to maintenance personnel via the communications system 180. The maintenance advisory may include a list of aircraft components which could have been damaged during the landing. The processor then generates a landing report and stores a landing report in the memory 130. (Step 350).

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the embodiments in any way. To the contrary, various changes may be made in the function and arrangement of the various features described herein without departing from the scope of the claims and their legal equivalents.

What is claimed is:

1. A hard landing warning system for an aircraft, comprising:
    at least one flight instrument collecting flight instrument data;
    a hard landing indicator; and
    a processor coupled to the at least one flight instrument and the hard landing indicator, the processor configured to:
        determine if the aircraft is in the landing phase based upon the flight instrument data;
        determine, when the aircraft is in a landing phase, a descent condition of the aircraft based upon the flight instrument data; and
        issue a hard landing warning via the hard landing indicator if the descent condition indicates a potential hard landing before the aircraft has landed.

2. The hard landing system of claim 1, wherein the flight instrument data includes a descent rate.

3. The hard landing system of claim 1, wherein when the descent condition is also based upon a configuration of the aircraft.

4. The hard landing system of claim 1, wherein when the descent condition is also based upon a weight of the aircraft.

5. The hard landing system of claim 1, wherein when the descent condition is also based upon a rotor condition of a rotor of the aircraft.

6. The hard landing system of claim 1, further comprising an accelerometer coupled to the processor, the accelerometer configured to measure a deceleration experienced by the aircraft, wherein the processor is further configured to:
    determine if the aircraft experienced a hard landing if the deceleration experienced by the aircraft was greater than a predetermined threshold; and
    generate a maintenance advisory if the aircraft experienced a hard landing.

7. The hard landing system of claim 6, further comprising a communications system coupled to the processor, wherein the processor is further configured to transmit the generated maintenance advisory to maintenance personnel via the communications system.

8. The hard landing system of claim 7, wherein the aircraft further comprises a memory coupled to the processor, the memory configured to store a threshold for each of a plurality of aircraft components on the aircraft,
    wherein the processor is further configured to:
        compare the deceleration experienced by the aircraft with the threshold for each of the plurality of aircraft components on the aircraft; and
        generate the maintenance advisory when the deceleration experienced by the aircraft is greater than the threshold of at least one of the plurality of aircraft components.

9. A method executed by a processor, the method comprising:
    determining if an aircraft is in a landing phase;
    determining, when the aircraft is in the landing phase, a descent condition for the aircraft; and
    issuing a hard landing warning when the descent condition indicates a possibility of a hard landing before the aircraft has landed.

10. The method of claim 9, further comprising:
    determining if the aircraft experienced a hard landing if a deceleration experienced by the aircraft exceeds a predetermined threshold;
    determining, if the aircraft experienced a hard landing, if one or more aircraft components could have been damaged during the hard landing; and
    issuing a maintenance advisory indicating which of the one or more aircraft components could have been damaged during the hard landing.

11. The method of claim 10, wherein the determining if one or more aircraft components could have been damaged during the hard landing further comprises comparing the deceleration experienced by the aircraft with a threshold for each of the one or more aircraft components.

12. The method of claim 10, further comprising generating a landing report based upon the hard landing.

* * * * *